350-371 SR CROSS REFERENCE SEARCH ROOM
XR 3,131,253

April 28, 1964 F. ZANDMAN ETAL 3,131,253

COLOR REPRODUCTION SYSTEMS

Filed May 18, 1959 2 Sheets-Sheet 1

X2556
X2676

INVENTORS
Felix Zandman
Jean Avril
BY
Thomas I. Davidson
ATTORNEY

3131253
OR IN 358/61

INVENTORS
BY Felix Zandman
Jean Avril
Thomas J. Davenport
ATTORNEY

United States Patent Office 3,131,253
Patented Apr. 28, 1964

3,131,253
COLOR REPRODUCTION SYSTEMS

Felix Zandman and Jean F. Avril, Paris, France, assignors, by mesne assignments, to The Budd Company, Philadelphia, Pa., a corporation of Pennsylvania
Filed May 18, 1959, Ser. No. 813,763
6 Claims. (Cl. 178—5.4)

This invention relates to color reproduction systems and methods, and more particularly to such systems and methods adapted to produce colored images by means of forced-birefringent materials interposed between black-and-white image and colored image positions in an optical system.

A television image is produced by the cyclic scanning displacement of a light spot over a screen in accordance with some predetermined law, usually by moving the spot over a horizontal line in a certain sense then quickly returning it to the start of a following line which is then scanned in the same sense and so on repetitively over the height of the screen, and finally returning the spot to the start of the initial line. The light spot in black-and-white television is a spot of white light of varying brightness and it is the variation in brightness of the spot over the scanning cycle which reproduces the desired image. Due to the persistence of the images formed on the retina of the human eye the successive scans and scanning fields are merged in the view of an observer.

Color television systems have interposed a suitable modulator in the path of the light from the light spot of black-and-white television, and have varied the optical characteristics of the modulator to provide a desired color at the point or area on the screen corresponding to the color at the corresponding point or area of a scene. In the past, however, proposed light modulators have necessarily included translated or rotated masses and their concomitant inertia has seriously affected their usefulness due to the difficulty in making rapid adjustments of their position or condition in synchronism with high frequency color image presentations.

A continuing source of trouble with conventional modulators has been in the presentation of true color images.

Therefore it is an object of this invention to provide improved color reproduction systems and methods adapted to present true color representations.

Another object is to provide color reproduction systems and methods including minimum inertia modulator means and operational sequence.

According to an illustrated embodiment, a color reproduction system according to this invention in combination with television receiver means producing sequentially black-and-white image information related to component colors of a scene to be reproduced at a viewing position comprises a modulator sheet of forced-birefringent material, a first polarizer interposed between the television receiver and the modulator, a second polarizer interposed between the modulator and the viewing position, and a piezoelectric vibrator mechanically coupled with the modulator imposing longitudinal, sonic, vibrations upon the material of the modulator in response to electric signals related to the sequential black-and-white image information.

Further, according to preferred methods of this invention reproduction of color images from sequentially presented black-and-white images related to color components of the colored images comprises the steps of imposing upon the forced-birefringent modulator longitudinal, sonic, vibrations at a constant amplitude to produce sequentially in transmitted polychromatic light a spectrum of colors, and the step of modulating the brightness of the black-and-white image to select color components from the spectrum related point by point to the true colors of a scene from which the black-and-white image was derived.

The forced birefringence of certain materials has heretofore been used in fields far removed from television, as in photoelastic devices for the analysis of stresses or for strain gauges, by taking advantage of the fact that the birefringent characteristic of a sheet or plate of the material is altered when the material is deformed under strain.

The present invention, in this connection, is further characterized in that the birefringent material, in the form of a sheet, plate, coating or block, or a liquid contained in a tank, has its birefringence characteristic varied by piezoelectric effect. That is, in the television system of this invention, stresses are set up in the material by the application of an electric voltage signal thereto. The resulting response of the material is practically devoid of inertia and hence extremely rapid, so that high frequency variations are made possible as is required in connection with the transmission of television signals.

The system of the invention is applicable both to direct-viewing systems of the type using a cathode ray screen, as is commonly used in current television systems, as well as to the so-called projection television systems wherein the viewer is positioned in front of a screen upon which an image is projected from a cathode ray tube or the like.

In the ensuing exemplary description reference is made to the accompanying drawings, wherein.

Figure 1:
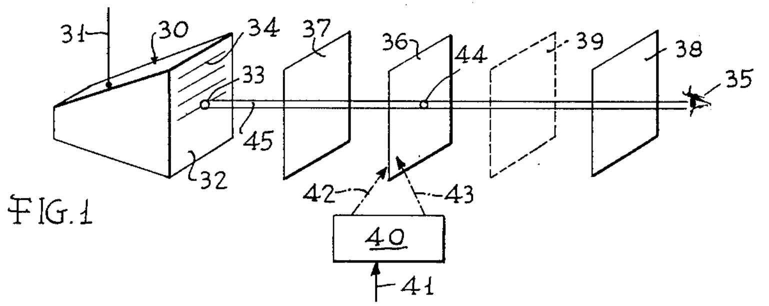
FIG. 1 is a diagrammatic view of a system according to this invention as applied to a direct-viewing television system.

There is illustrated in FIG. 1 in diagrammatic form a color television system according to an embodiment of the invention. A conventional television receiver 30 is adapted to receive video image signals at its input 31 and is provided with a cathode ray tube screen 32 upon which a black-and-white image is viewable as produced by the rapid scanning displacement of a white light spot 33 scanning the screen along repeated horizontal lines as 34. Interposed between the screen 32 and an observer 35 is a block or strip 36 of forced-birefringent material. Two light polarizing devices 37 and 38 are interposed respectively between the screen 34 and the block 36 and between the block 36 and the observer 35. As suitable polarizers various devices may be used, such as Brewster angle-reflectors, Nicols, or polarizing strips of dichroic material. A compensator strip 39 of birefringent material may be interposed between the forced-birefringent material block 36 and polarizer 38 if desired for a purpose to be specified presently.

In accordance with this invention the birefringent block 36 is subjected to the action of a magnetic or electromagnetic device 40 which may be an electromagnet, a piezoelectric crystal, or a magnetostrictive device. The device 40 has an input 41 which is supplied with a variable electric signal and produces a variable output force as indicated by arrows 42, 43, adapted to modify the block 36 so that the area 44 thereof traversed by the light beam 45 from point 33 of the screen will appear to the observer as having the same color as the corresponding area of the object or scene being televised.

A compensator plate or sheet 39, which may be made of a suitable plastic material, possess permanent birefringence, and serves to pre-adjust the color of the light spot in the absence of any output from the unit or block 36.

Figure 2:
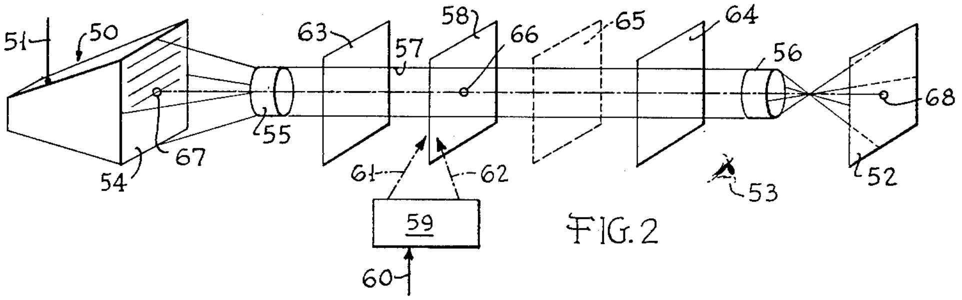
FIG. 2 is a similar view of a system of the invention as applied to a projection television system.

In the embodiment of FIG. 2, a television receiver 50 receiving image signals at its input 51 produces an image on a cathode ray tube or similar screen 54. The optical projection system includes as its chief components lens units 55 and 56. The image is projected on a screen 52 and viewed by a spectator indicated at 53.

In this embodiment the variable birefringence block or strip 58 is interposed in the path of the projected light beam 57, and the block or strip is excited by means of a piezoelectric device 59 or the like having an input at 60 and a force output schematically indicated by the arrows 61 and 62. At either side of the birefringent unit 58 are positioned polarizers 63 and 64. Preferably, a color-adjusting compensator element 65 is also provided as in the system of FIG. 1. The piezoelectric unit 59 controls the birefringent element 58 so that in the section 66 traversed by the projection beam issuing from the area 67 of the television screen the birefringent element modifies the beam so that the color of the resulting light spot 68 on the screen 52 is the same as the color of the object of which the area 67 is a televised image.

In this latter embodiment it is possible to use a variable-birefringence element of relatively small size, so that it becomes easier to eliminate the effects of standing waves liable to be established in the element due to its excitation by the piezoelectric device. Mechanical distortions are transmitted to the birefringent element in accordance with the laws of propagation of sonic and ultrasonic vibrations.

Figure 3:
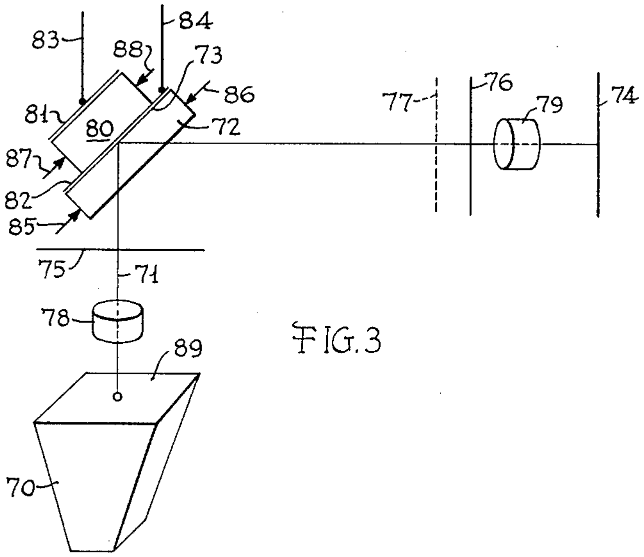
FIG. 3 illustrates a modification of this latter system.

In the arrangement shown in FIG. 3, a preferred embodiment of this invention, the black-and-white television receiver 70 generates a projection beam 71 arranged to impinge on the variable birefringence element 72 at an angle to its surface; the rear face 73 of the element 72 is made reflective and a projection screen 74 is interposed in the path of the reflected beam. A sheet polarizer 75 is inserted between the television receiver 70 and the element 72 and a second sheet polarizer 76 is positioned between element 72 and screen 74. If desired a compensator sheet 77 is provided as in the above-described embodiments. Lenses 78 and 79 are inserted respectively ahead of the polarizer 75 and behind polarizer 76. The birefringent element 72 is desirably a high-sensitivity, forced-birefringent plate or strip, of Bakelite for example or it may be a film of the same material deposited on a transparent support. The birefringent element or coating is contiguous with and bonded to one side of a transparent piezoelectric crystal 80 having electrodes 81 and 82 respectively connected by leads 83 and 84 to a power source. A metallic film is interposed between the birefringent element 72 and the piezoelectric crystal 80 to serve simultaneously as a mirror surface for reflecting the beam 71 and as an electrode for energizing the crystal 80. The forced-birefringent plate or coat 72 is shown as mounted between points indicated by arrows 85 and 86 and the crystal 80 is likewise mounted between points 87 and 88, in order to provide substantially undamped mounting means for both the element and the crystal. The element 72 and the crystal 80 are provided with such relative thickness dimensions that the effect of standing waves is minimized or eliminated while providing for maximum deformation of the element 72 for a piezoelectrical effect of a given amplitude.

In the system of FIG. 3, both the birefringent element 72 and the crystal 80 undergo deformation involving expansion and contraction of the thickness thereof. The dimensions may be selected so that end faces of the element are substantially coincident with the nodal planes.

With such an arrangement the projection beam delivered by the black-and-white television receiver may be thought of as being reflected from a mirror which changes in color in accordance with the color of the object point which at any instant corresponds to the particular image point on the cathode screen 89 of the television receiver.

Figure 4:
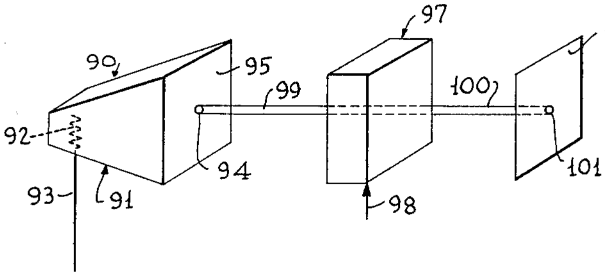
FIG. 4 is an explanatory diagram.

In the diagram of FIG. 4 a black-and-white television receiver 90 is shown as comprising a cathode ray tube 91 having its electrode 92 supplied through a lead 93 with a signal voltage which determines the brightness of the light spot 94 on the cathode screen 95 at any particular time. Between the receiver 90 and the projection screen 96, assuming a projection-television viewing system is involved, there is interposed a light-modulator device 97 according to this invention, comprising as in the previously described embodiments a variably birefringent element. This element is energized by a voltage signal received from the television transmitter and applied thereto by way of a lead 98. The energizing signal is such that the incident white light beam 99 as it traverses the element 97 is converted into a color beam 100 corresponding in color to that of the area of the object being televised which is represented in black-and-white by the spot 94 on the cathode screen 95; hence the area 101 illuminated by the beam upon the screen 96 also appears with the represented color.

This invention may, conversely, be utilized upon interposing the above described optical device between a television camera and a scene to be televised. This invention may likewise be applied in connection with the transmission and reception of still pictures, in accordance with the techniques generally known as telephotography.

An embodiment of a color television system according to this invention will now be described in somewhat greater detail. In this embodiment, the white-light television beam is modulated in periodic cycles into the sequential shades of a color spectrum as above while the brightness of the respective constituent point of the television image is varied to give form to the image in the conventional manner. At the same time, in superimposed relation with the conventional brightness variations, further cyclic brightness variations at a substantially higher frequency are applied so that for each point of the cathode screen the maximum brightness occurs at the instant at which the color modulator is in a condition corresponding to the color of the object point that is being reproduced.

In other words, in this embodiment, the black-and-white television image is viewed through a stroboscopic system which is arranged to isolate at any particular instant of time that particular color, of a cyclically repeated color spectrum, which corresponds to the object-point being scanned and forming the televised image on the cathode screen at that instant.

Such a color television system, including a black-and-white television system together with color modulating means and stroboscopic means in the combination just specified, represents per se an important aspect of the invention, and will now be described in greater detail as applied simultaneously with the use of an artificially birefringent element of the kind previously described herein.

Figure 5:
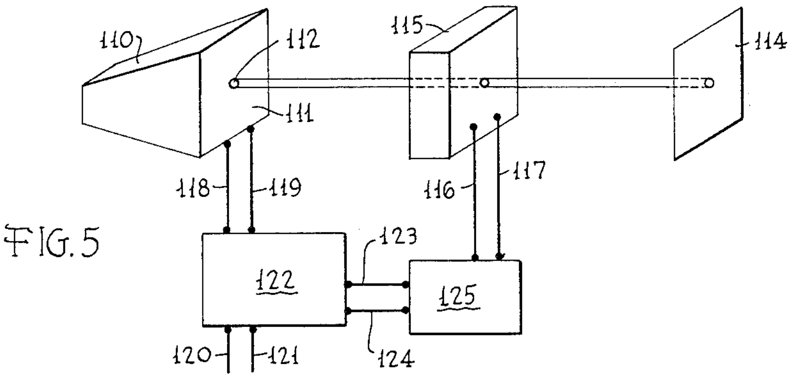
FIG. 5 is another simplified explanatory diagram.
Figure 6:
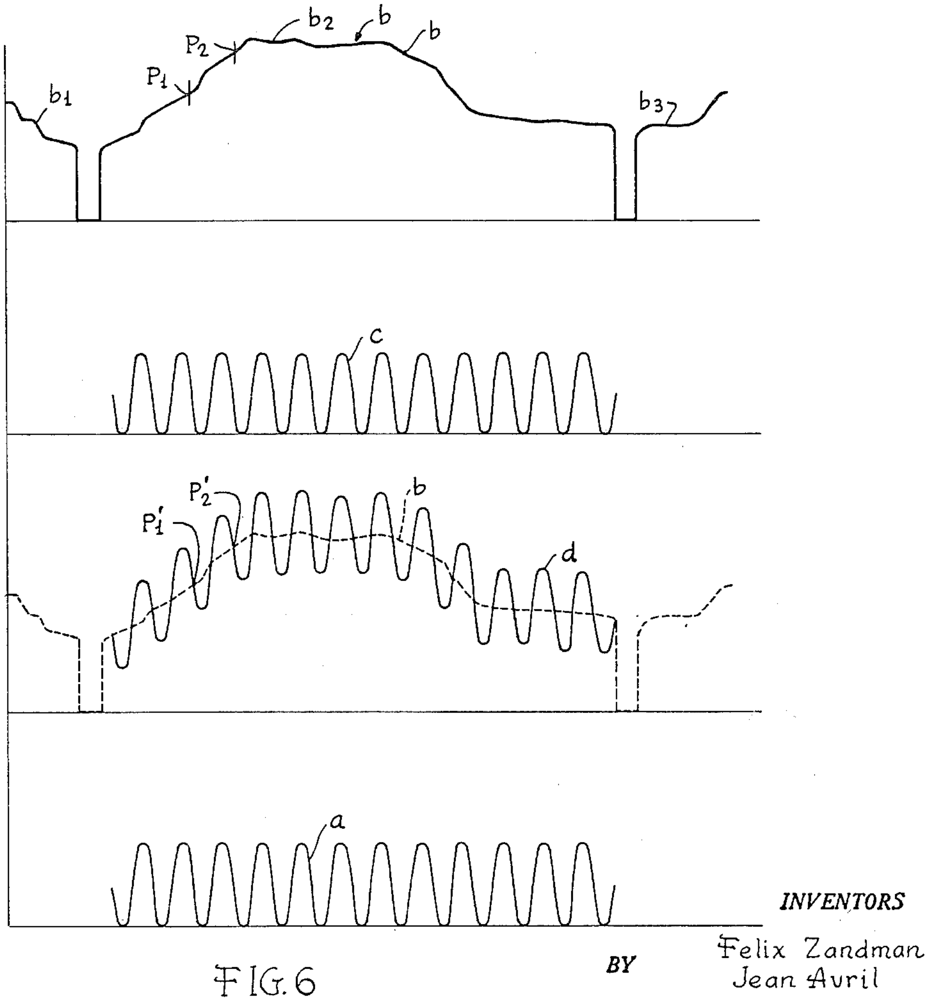
FIG. 6 is a graphic explanation of the time relationships between color and brightness modulations.

Referring to FIG. 5, 110 designates a cathode ray tube or the like having a screen 111 upon which the televised image is formed by scanning displacement of the light spot 112. Interposed between the projection screen 114 and the cathode tube 110 is a light-modulating assembly similar to that described above and here indicated by a single unit or block 115. This modulating unit may comprise for example a high-sensitivity variably birefringent element bonded to a piezoelectric crystal as shown in FIG. 3. The voltage signal is applied to the modulator across leads 116 and 117 in a manner similar to the application of the signal voltage across the leads 83 and 84 of FIG. 3. In accordance with the invention, the signal voltage applied across leads 116 and 117 is a sine voltage of relatively high frequency, e.g. a few megacycles per second. The voltage is of a constant amplitude selected so that the modulator 115 will pass light rays in all the shades of a range known as the Newton scale, over a full semi-cycle of said voltage. The signal voltage is indicated by the sine wave $a$ in FIG. 6. This diagram further illustrates at $b$ the voltage curve of a conventional video image signal which is applied across the input terminals 118 and 119 of tube 110 to provide the black-and-white television image. Both curves $a$ and $b$ are shown plotted in a coordinate system wherein the abscissa is time and a common time origin is selected so that vertically aligned representative points on the respective curves $a$ and $b$ refer to a common instant of time. The ordinates are voltage amplitudes.

The curve $b$ includes an initial portion $b_1$ which corresponds to the scanning displacement at the end of a line, followed by a portion $b_2$ corresponding to the scanning of a complete line and a portion $b_3$ corresponding to the scanning of the initial part of the next line. The curve $b_2$ may be thought of as representing values proportional to the brightness of the light spot 112 as a function of time. According to the invention, over the image signal voltage represented by the curve $b$ there is superimposed a sine voltage of the same frequency as that of the voltage represented by the curve $a$ referred to above. This additional voltage is represented by the curve $c$ in the diagram. For example the image voltage $b$ may be applied to a first pair of input terminals 120, 121 of a mixer 122 and the additional voltage to the second input 123, 124, of the mixer, so that the output voltage applied to the cathode ray tube 110 through leads 118 and 119 from the output of mixer 122 will be represented by the curve $d$. This curve $d$ is of generally sine form about an average line represented by the curve $b$. The brightness of any given small area or point $p$ on the cathode screen 111 defined by the points $p_1$ and $p_2$ on the curve $b$, would, if the cathode tube had applied to it only the conventional voltage signal present in a black-and-white television system, be represented by the common (or substantially equal) ordinates of the points $p_1$ and $p_2$; however, owing to the presence of the additional voltage applied to the input 123–124 according to the invention the said brightness is varied at a very high rate about the said common value, as shown by the portion of the curve $d$ included between the points $p_1'$ and $p_2'$.

The invention provides means indicated by the block 125 for introducing between the voltage applied to the input of modulator 115 as indicated by curve $a$ and the additional voltage applied to mixer 122 as represented by curve $c$, a phase shift such that the modulator 115 will be brought by voltage $a$ to that condition where it will modify the light rays in the path of which it is inserted in the manner required to impart thereto the particular color of the object point corresponding to point $p$ in the televised image, precisely at those instants at which the brightness $p$ is substantially a maximum. Under such condition, the eye will practically see the point $p$ with that color which corresponds to the color of the corresponding object point, while the images of said point in other shades of color as provided by modulator 115 are so greatly attenuated in brightness that they will remain practically invisible. The color effect thus described is quite easily provided in view of the fact that the human eye is comparatively less sensitive to variations in color than to variations in brightness.

Means are further provided according to the invention for varying the amplitude of the sine voltage $c$ superimposed over the voltage $b$ as a function of the intensity of the color. Thus, for each point, it is possible not only to provide the desired color effect but also the desired color intensity effect which is known to be a necessary factor in any satisfactory color reproduction system. This factor is sometimes known as "purity" or "saturation."

The invention comprises a transmitter system for a color television system as described. Such a transmitter will comprise, in addition to the conventional means for emitting signals similar to those of a black-and-white television system as shown by the curve $b$ in FIG. 6, further means for transmitting a constant-amplitude, high-frequency sine voltage as shown by curve $a$ and means for transmitting a sine voltage of the same frequency as $b$ but phase-shifted with respect thereto by an amount corresponding to the color shade of the object point being transmitted at the time under consideration, as well as further means for varying the amplitude of the said voltage represented by curve $c$ in accordance with the purity or saturation of the color.

For this purpose a phase shift is introduced between the voltages represented by curves $a$ and $c$ as a function of the color shade, and the amplitude of the voltage represented by curve $c$ is varied as a function of saturation. It will be understood that it may not be necessary to transmit in a permanent manner the voltage signal $a$ but that it may be sufficient to transmit only regularly spaced synchronizing signals for synchronizing the sine wave generator at the receiver end, e.g. during the line synchronizing signals.

The invention further includes television receiver sets adapted to receive signals from color television transmitters of conventional color television networks and transmitting signals that are functions of color shade and saturation, or other equivalent factors, and to convert the received signals into signals of the type described above for providing a modulation and a stroboscopic effect as required for the purposes of the present invention.

What is claimed is:

1. A color television system for reconstituting a color scene at a viewing position from sequential black and white image elements representing color components of the corresponding image elements of the scene, which system comprises:

black and white television receiver means including
- a cathode ray tube having a fluorescent screen,
- cathode ray beam generator means directing a collimated cathode ray beam upon the screen to produce a light spot,
- vertical and horizontal deflection means deflecting the beam to scan the light spot over the screen in successive image element traces, and
- intensity control means generating a conventional brightness modulation of the light spot by varying the intensity of the beam to produce black and white picture elements representing color elements of the scene;

stroboscopic means coupled with the intensity control means superimposing a fixed frequency cyclic brightness modulation upon the conventional brightness modulation during the production of each image element;

a color modulator interposed between the screen and the viewing position including
- a plate of forced birefringent material selectively transmitting cycles of colors in polarized light when subjected to predetermined cyclic stresses,
- optical means polarizing light transmitted between the screen and the plate and analyzing light transmitted between the plate and the viewing position, and
- piezoelectric means generating the predetermined cyclic stresses within said plate at the frequency of the cyclic brightness modulation; and phase control means coupled with the stroboscopic means and the piezoelectric means superimposing the peak periods of the cyclic brightness modulation and the periods of the selective color modulator transmission of the respective color represented by the black and white picture elements.

2. A system for producing a pattern at a viewing position in which a particular color predominates, which system comprises imaging means generating a white light representation of the pattern at a first position, color modulator means interposed between the first position and the viewing position selectively transmitting light of plural repeated cycles of different colors including the particular color, and intensity modulation means coupled with the imaging means and the color modulator means increasing the brightness of the white light representation during the plural periods when the color modulator means selectively transmits the particular color.

3. A transducer system for conversion between a polychromatic image at a first position and a monochromatic image representing a particular color component of the polychromatic image at a second position, which system comprises means illuminating one of said images with polychromatic light, means cyclically varying the intensity of light transmitted from said one image to the position of the other said image, means interposed in the path of the light transmitted from said one image to the position of the other said image selectively transmitting colors of the polychromatic image in cyclicly repeated sequences, and means superimposing the peak periods of the cyclic brightness variation and the periods of color modulator transmission of the respective color of the monochromatic image.

4. The combination of claim 1 wherein said color modulator comprises a sheet of forced-birefringent material attached to a piezoelectric crystal vibrator and a reflective surface interposed between said sheet and said crystal.

5. The combination of claim 4 wherein said reflective surface is a metallic film and constitutes one electrode for said crystal.

6. A system for transforming black and white partial image fields projected from a first position into full color image scenes at a second position, which system comprises first means generating, at the first position and at a first field repetition rate, repeated field sequences each including in a given order different black and white partial image fields corresponding respectively to different component color partial images constituting the full color scene at the second position, second means interposed between the first and second positions selectively transmitting the colors of the component color partial images in sequences repeated at a second repetition rate substantially greater than the first repetition rate, third means coupled with said first means cyclicly modulating the brightness of the black and white partial images, and fourth means coupled with said second and third means superimposing in time the respective periods of the selective transmission of a component color and the maximum brightness periods of the cyclic modulation of the black and white partial image field corresponding to that color.

References Cited in the file of this patent

UNITED STATES PATENTS

| | | |
|---|---|---|
| 2,350,892 | Hewson | June 6, 1944 |
| 2,600,962 | Billings | June 17, 1952 |
| 2,616,962 | Jaffe | Nov. 4, 1952 |
| 2,638,816 | Stolzer | May 19, 1953 |
| 2,680,146 | Rosenthal | June 1, 1954 |
| 2,744,156 | Toulon | May 1, 1956 |